United States Patent [19]
MacKinnon

[11] 3,902,372
[45] Sept. 2, 1975

[54] SAMPLE CARRYING VIAL AND MEANS FOR INTRODUCING THE VIAL AND ITS LIQUID SAMPLE INTO LIQUID ANALYZING SYSTEM

[75] Inventor: Kent L. MacKinnon, Los Altos, Calif.

[73] Assignee: Durrum Development Corporation, Palo Alto, Calif.

[22] Filed: Dec. 13, 1973

[21] Appl. No.: 426,727

Related U.S. Application Data

[63] Continuation-in-part of Ser. No. 185,291, Sept. 30, 1971, abandoned.

[52] U.S. Cl................. 73/422 GC; 73/61; 210/282
[51] Int. Cl.²..................... G01N 1/00; B01D 27/00
[58] Field of Search.... 73/423 A, 422 GC; 210/232, 210/282

[56] References Cited
UNITED STATES PATENTS

| | | | |
|---|---|---|---|
| 3,247,704 | 4/1966 | Konig............................. | 73/422 GC |
| 3,463,320 | 8/1969 | Patterson.......................... | 210/232 |
| 3,527,101 | 9/1970 | Sprunger......................... | 73/422 GC |
| 3,583,230 | 1/1971 | Patterson........................ | 73/422 GC |

*Primary Examiner*—S. Clement Swisher
*Attorney, Agent, or Firm*—Flehr, Hohbach, Test, Albritton & Herbert

[57] ABSTRACT

A sample-carrying vial and means for introducing the vial and its liquid sample into a high pressure liquid analyzing system of a type as, for example, used in providing amino-acid analysis of liquid samples and the like. The system interposes a series of small elongated vials containing liquid sample directly into a discontinuity formed in a high pressure fluid feed line of the analyzing system. The vials rollingly advance into axial alignment with a pair of confronting nozzles arranged to advance and retract relative to each other for engaging the ends of the vial under substantial sealing force. After the contents of the vial have been discharged under pressure via one of the nozzles, the vial is released from engagement with the nozzles and discharged.

17 Claims, 9 Drawing Figures

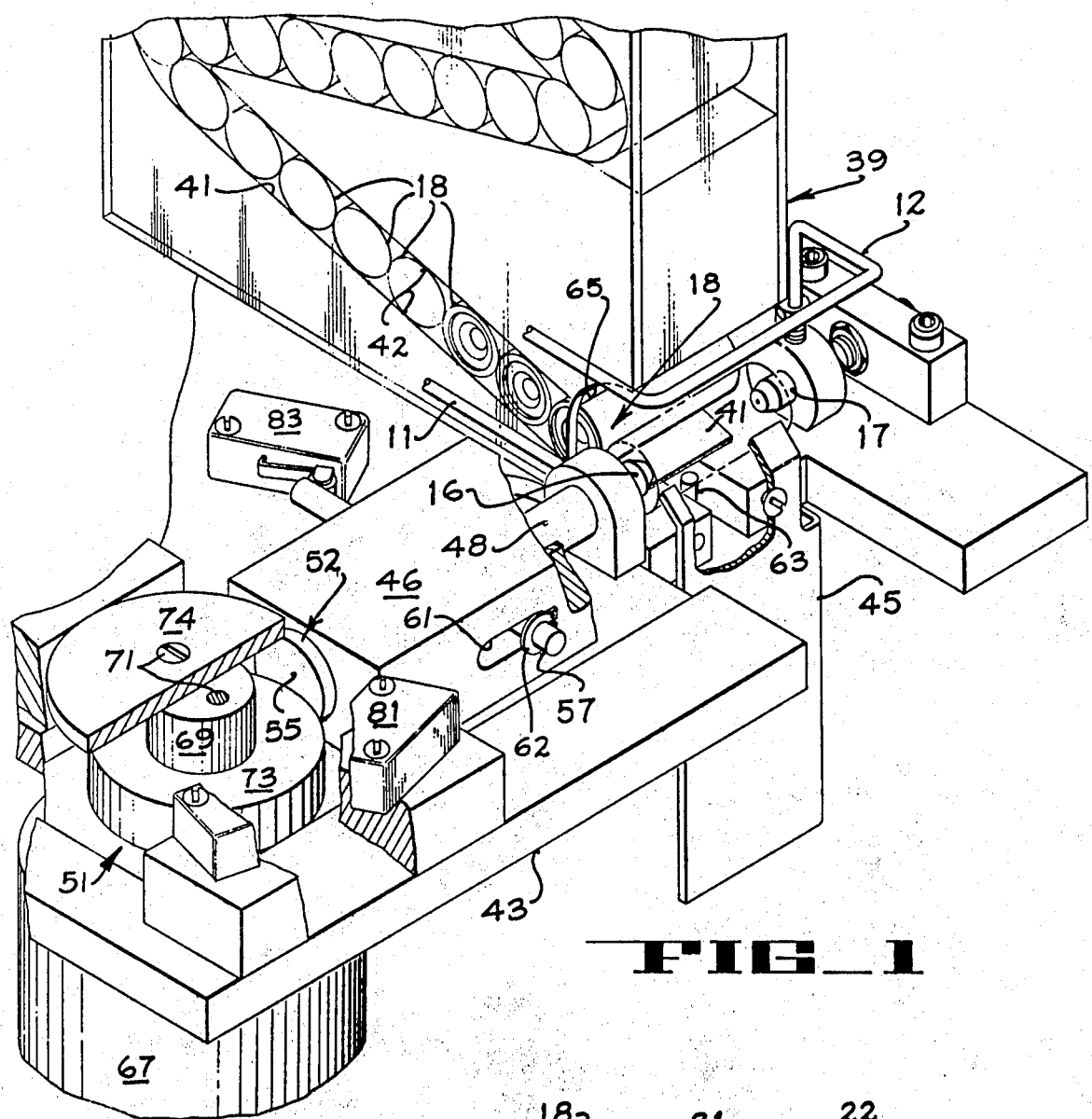
FIG_1
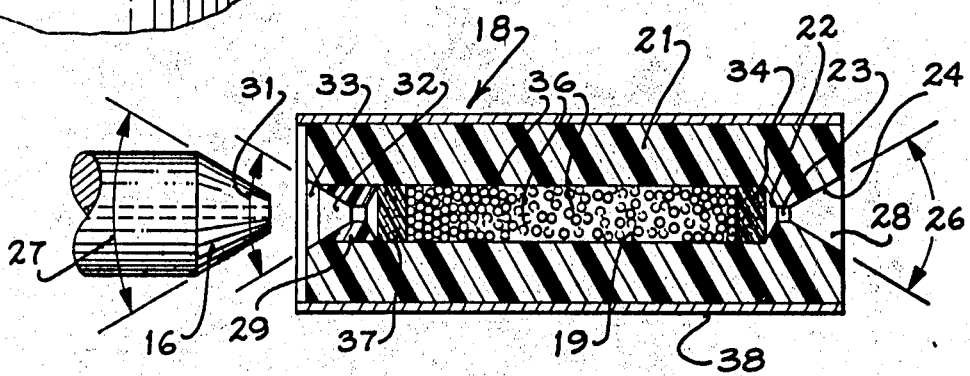
FIG_3

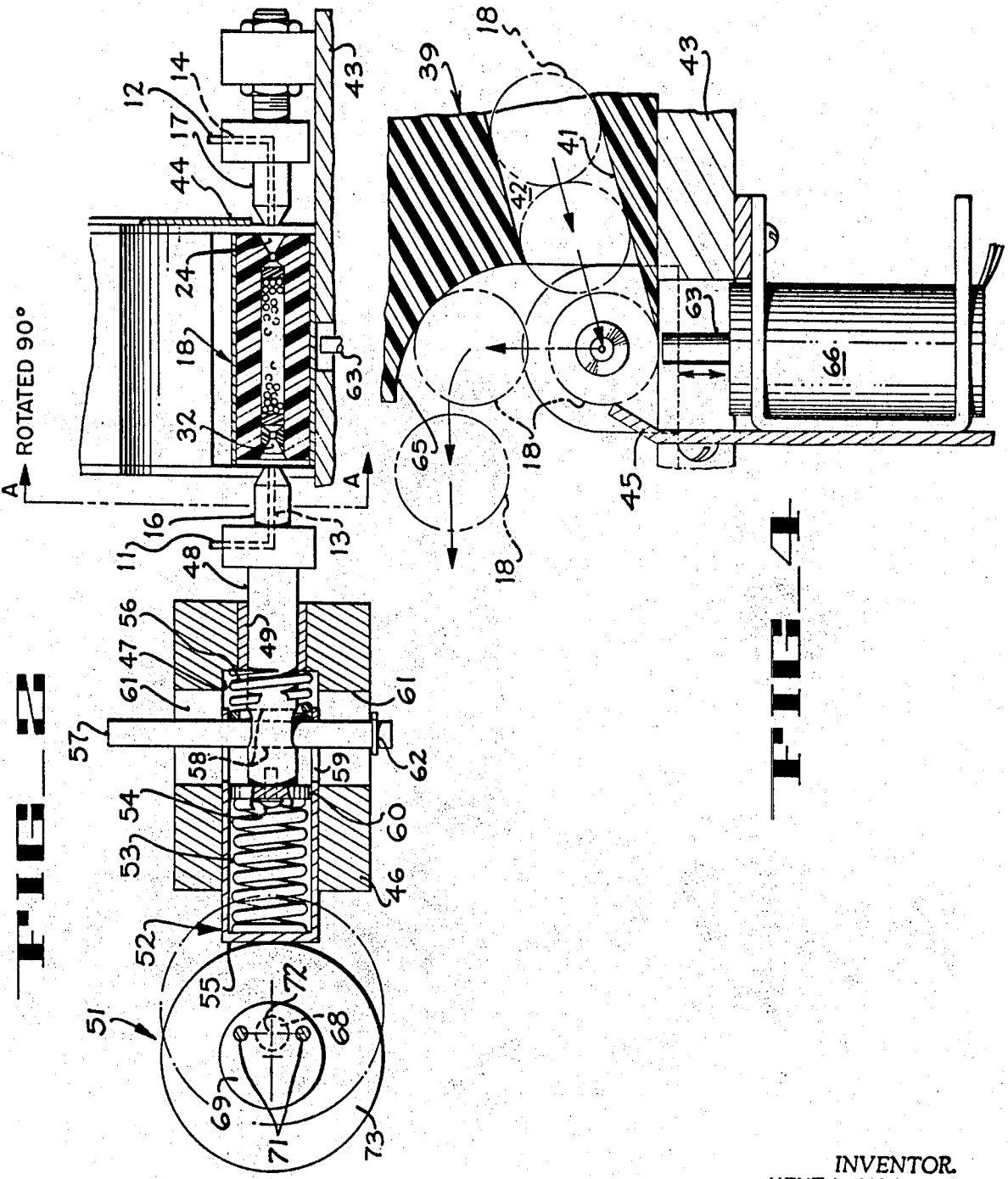

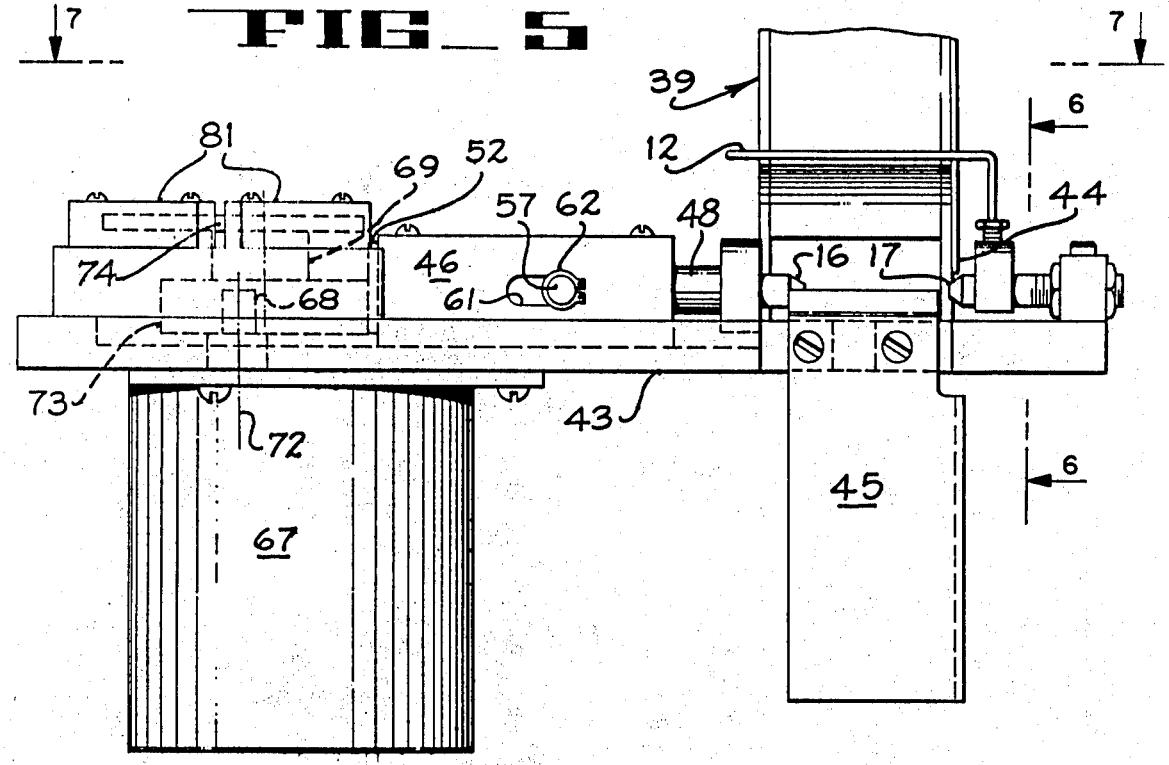
FIG_5
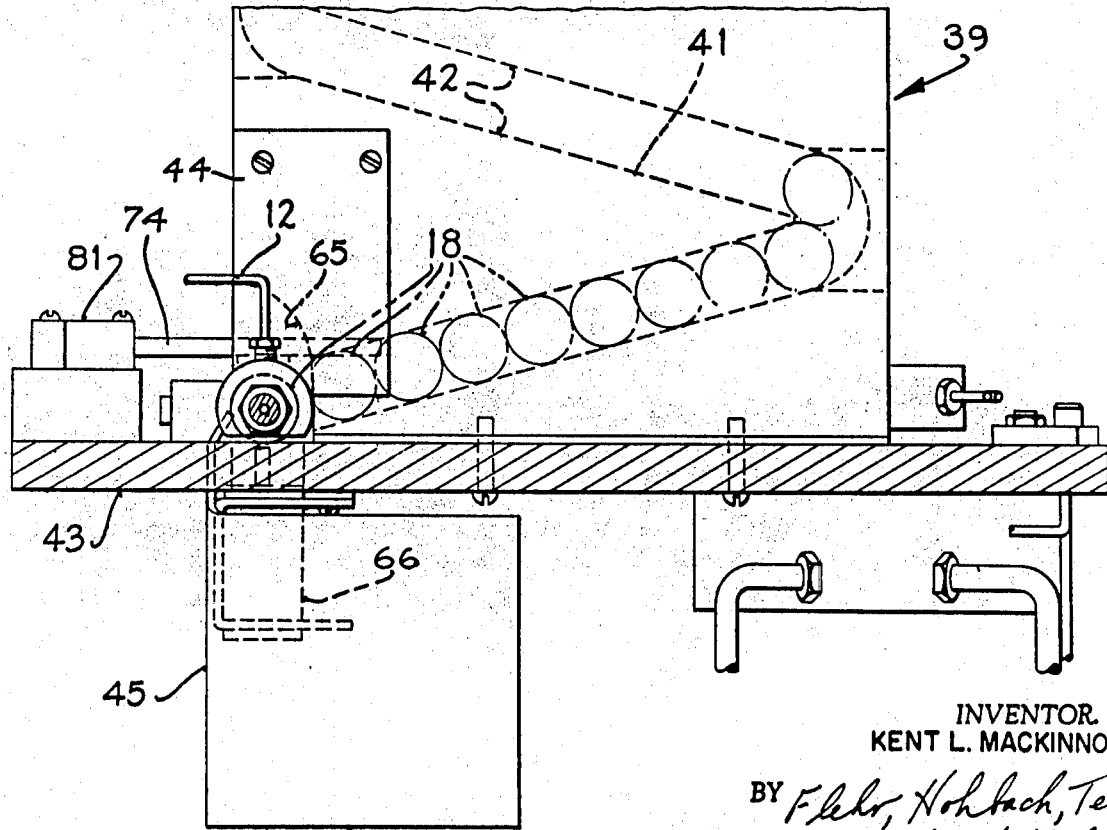
FIG_6
INVENTOR
KENT L. MACKINNON
BY Flehr, Hohbach, Test,
Albritton & Herbert
ATTORNEYS

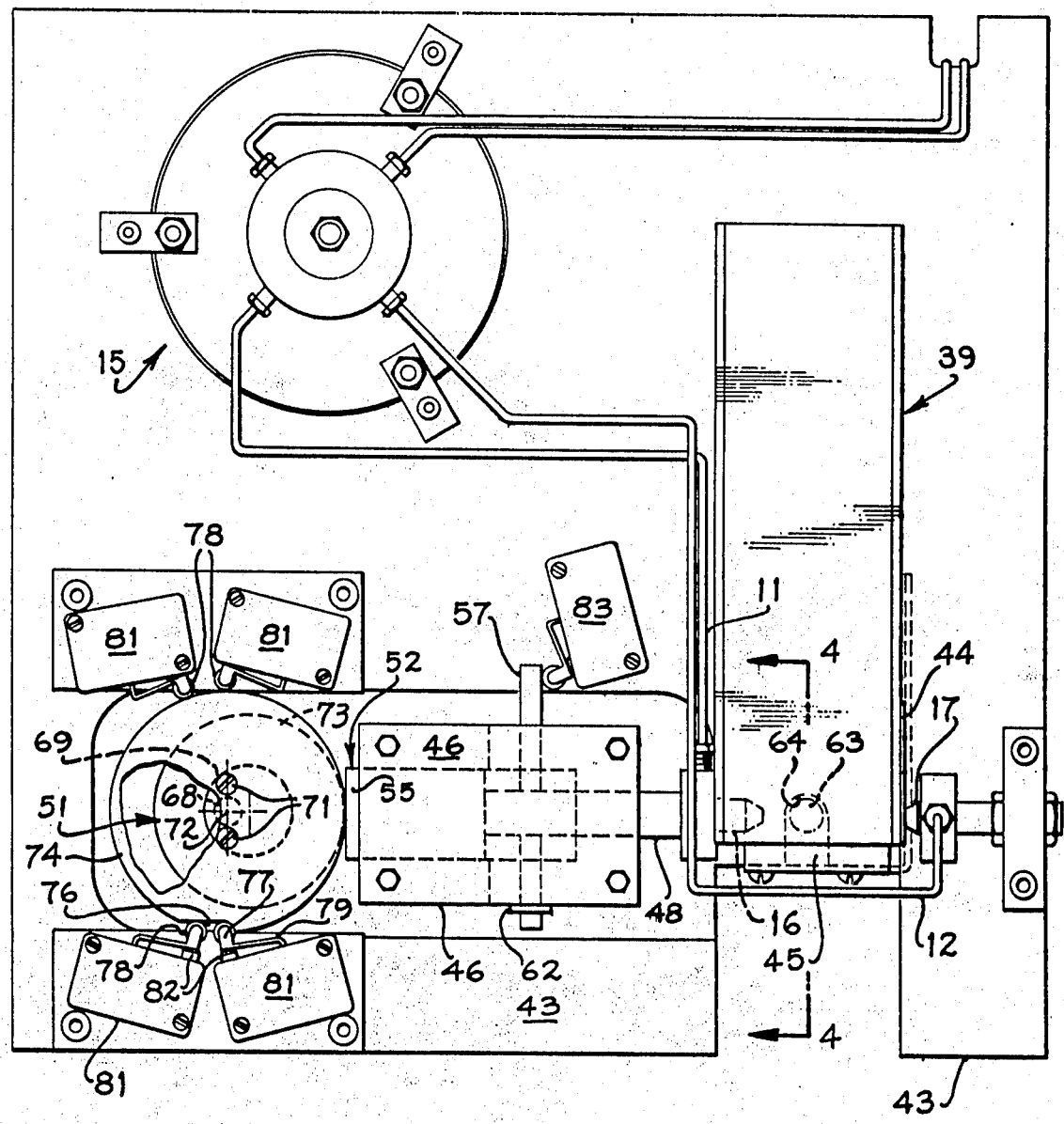
FIG_7

3,902,372

SAMPLE CARRYING VIAL AND MEANS FOR INTRODUCING THE VIAL AND ITS LIQUID SAMPLE INTO LIQUID ANALYZING SYSTEM

CROSS-REFERENCE TO RELATED APPLICATIONS

This application is a continuation-in-part application of U.S. Ser. 185,291, filed Sept. 30, 1971, assigned to Durrum Development Corporation, recorded Sept. 30, 1971, Reel 2825, Frames 572-574 now abandoned.

BACKGROUND OF THE INVENTION

This invention pertains to accessory equipment utilized in conjunction with high pressure liquid analyzing systems of a type useful, for example, in providing amino acid analysis of liquid samples. More particularly, the present invention serves to interpose a small, elongated vial containing liquid sample directly into a discontinuity formed in a high pressure fluid feed line of the analyzing system.

SUMMARY OF THE INVENTION AND OBJECTS

In general, in a system for analyzing the constituents of a liquid sample of a type wherein buffers or other sample carrier liquids are applied to liquid sample disposed in individual vials of a type having flow passages at each end thereof, there is provided means forming a liquid feed line including an open section thereof defined between axially aligned open end portions of the feed line. Tapered nozzles are carried on each of the feed line end portions in sufficient spaced relation to receive one of the vials therebetween for interposing the particular vial in fluid communication with the feed line via the vial flow passages. Means are provided for positioning one of the vials into the open section of the feed line along with means for relatively moving the nozzles axially together so as to engage and form a seal with the flow passages of the vial held between the nozzles thereby interconnecting the open end portions of the feed line via a given vial.

The vials, pre-loaded with sample, are preferably arranged to be supplied from a magazine containing a number of such vials whereby one after another can be introduced into the feed line.

In general, it is an object of the present invention to provide a sample holding unit or sample-containing vial in improved form together with means for introducing the vial and its liquid sample directly into a high pressure feed line of a liquid analyzing system.

It is another object of the present invention to provide an arrangement of the foregoing style wherein reliable sealing is effected at the point of introducing a vial into the feed line of a fluid analyzing system.

It is yet another object of the invention to provide a vial handling assembly of a type whereby the sample holding units or vials are fed one at a time to be introduced into the feed line and then properly discharged therefrom.

The foregoing and other objects of the invention will become more readily evident from the following detailed description of a preferred embodiment of the invention when considered in conjunction with the drawings.

BRIEF DESCRIPTION OF THE DRAWING

FIG. 1 is a diagrammatic perspective view of a vial handling machine according to the invention;

FIG. 2 schematically shows, in enlarged detail, means for interposing a sample holding unit into an open section of a feed line according to the invention, that portion located to the left of the phantom line A—A being shown partially in section in plan view and the portion to the right thereof being shown as a front elevation view partially in section;

FIG. 3 shows, in enlarged detail, an elevation center line section view of a sample holding vial according to the invention;

FIG. 4 shows an enlarged diagrammatic view of the portion of FIG. 7 taken in the region of the line 4—4;

FIG. 5 shows a front elevation view according to the invention as shown in FIG. 1;

FIG. 6 shows a side elevation view taken along the line 6—6 of FIG. 5;

FIG. 7 shows a plan view taken along the line 7—7 of FIG. 5;

FIG. 8 shows an elevation section view of another embodiment of the vial according to the invention; and FIG. 9 shows another embodiment of FIG. 8.

DETAILED DESCRIPTION OF PREFERRED EMBODIMENTS

In one liquid sample analyzing system, the liquid sample is introduced into a fluid feed line under high pressure along with suitable buffers and other sample carrier liquids so as to determine the constituents of the liquid sample.

As disclosed herein, means forming a liquid feed line include a supply and return section of tubing 11, 12 respectively coupled to hollow flow passages 13, 14 formed to provide axially aligned open end portions of the feed line defined between tapered nozzles 16, 17 respectively carried on each such open end portion of the feed line.

The nozzles are spaced sufficiently axially apart so as to receive one of a number of sample holding vials 18 therebetween for interposing vial 18 in fluid communication with flow passages 13, 14 of the feed line.

Vials 18 each comprise a body means forming a cylindrical, hollow, elongated enclosure 19 of inert material such as one of several suitable plastics. One particular plastic which has proven suitable for this purpose is a group of fluorocarbon products, including polymers of trifluoroethylene and certain copolymers as sold under the registered trademark "Kel-F" of Minnesota Mining and Mfg. Co.

The foregoing plastic is typically inert to the usual buffer and sample solutions to which body member 21 may be exposed. Body member 21 is typically formed by boring the cylindrical enclosure 19 by entry through one end (the left end) of body member 21 as shown in FIG. 3. A beveled taper 22 forms one end wall of enclosure 19 and leads to the right hand flow passage 23 connected directly to the conically shaped recess 24 whose side walls diverge axially outwardly of body member 21 at an angle slightly less than the angle of taper applied to the ends of nozzles 16, 17.

Thus, the angle 26 may, for example, be on the order of 57° while the angle 27 may be slightly larger, of the order of 60°. In this way as the tapered surface of nozzle 17 enters the interior of recess 24, the initial engagement will typically be in the region of the outer edge margin 28 of recess 24 so as to provide improved initial sealing therewith.

The other end of enclosure 19 includes a generally similar configuration but the geometry at the left end of vial 18 is formed from an inert plug 29 of semi-rigid material having limited compressibility such as the "Kel-F" product noted above and disposed slightly axially inwardly of the lefthand end (as shown in FIG. 3) of body member 21. The outwardly divergent angle 31 of recess 32 is continued by the beveled surface 33 formed in the end of body member 21. Accordingly, as nozzle 16 enters recess 32, the first contact will be a sealing contact in the beveled margin surface 33.

Vial 18 is located by first introducing a porous, inert plug 34 of suitable material such as sold under the trademark Teflon at one end of enclosure 19, adding a substantial supply of inert beads 36 such as glass or otherwise for purposes described further below, adding a second plug 37 of suitable inert, porous material such as sold under the term Teflon, and then introducing the semi-rigid closure plug 29 at the left end, as shown.

A rigid cylindrical jacket 38 surrounds body member 21 so as to render it capable of withstanding prolonged high pressure from within enclosure 19.

As thus arranged, it will be readily evident that there has been provided a sample holding unit comprising a body means forming a cylindrical, hollow, elongated enclosure of inert material for holding liquid sample therein. Inert beads are packed within the enclosure for minimizing the sample-occupied space therein so that only a small fraction of sample needs to be introduced. The porous plugs 34, 37 are disposed at each end of the enclosure for passing liquid therethrough while retaining the inert beads within enclosure 19. Flow passages are also readily formed at each end of the enclosure so as to include conically shaped side wall recessed surfaces diverging radially and axially outwardly of enclosure 19 for receiving the tapered nozzles 16, 17 seated therein.

From the foregoing, it is readily evident that the sample holding unit or vial 18 includes an insert element such as the plug 29 disposed in one end of enclosure 19 to form a portion of one of the two conically shaped side wall surfaces 32 while the other of the side wall surfaces 24 is formed solely from the material forming body member 21. In this manner, the opportunity for leaking under high pressure is minimized while, at the same time, simplifying manufacture and assembly of sample holding units.

Means, as further described below, in the form of a magazine 39 is arranged to contain a number of such vials 18 for supplying them successively to a vial-mounting zone defined between the trips of nozzles 16, 17.

The vial to be mounted upon nozzles 16, 17 arrives in the position axially aligned between the two nozzles 16, 17 by rolling along the surface 41 of a moderately downwardly sloping ramp 42 formed within magazine 39 (FIG. 4).

An arresting stop element 45 is disposed in the path of vials rolling along ramp 42 so as to arrest the lowermost vial substantially in line with the axis defined between nozzles 16 and 17.

Before providing a detailed explanation of the construction of the apparatus as shown specifically in the drawings, a brief and general description of the arrangement of the means for engaging the ends of a vial 18 between the two nozzles 16, 17 may be provided most readily with respect to examination of FIG. 2.

Thus, nozzle 17 is mounted upon a stationary support base 43. The deck surface 41 of ramp 42 serves to support a vial 18 lying on its side. Interposed between the right hand end of vial 18 and nozzle 17 a spring release plate 44 depends downwardly to a point slightly clear of surface 41. Plate 44 is resiliently urged to the left as shown in FIG. 2 for the general purpose of releasing the right hand end of vial 18 from nozzle 17 after the liquid sample contents of vial 18 have been discharged and after the rightward urging of vial 18 as described below has been released.

Nozzle 16 is arranged to move between advanced and retracted positions relative to nozzle 17 so that nozzle 16 can be retracted and permit such succeeding vial 18 to enter the mounting zone defined between nozzles 16, 17 and the arresting stop member 45 along one side thereof.

Nozzle 16 is supported on the end of a connecting rod 48 journalled for axial movement of an anti-friction bushing 49 formed in one end of a mounting block 46. Connecting rod 48 is driven by drive cam means or assembly 51 using an eccentrically driven annular bearing 73 which engages the left end of a cylindrical sliding housing 52 arranged to be driven rightwardly (as shown in FIG. 2) into the space designated 47. Means forming a somewhat resilient drive connection includes a force transfer spring 53 anchored at its right end by stud 54 threaded through a retaining disc 60 and into the left end of connecting rod 48 to transfer the drive force of cam means 51 to connecting rod 48 and thereby move housing 52 to the right into recess 47 against the bias resistance of a return spring 56.

The force of spring 53 is typically quite large whereby the driving effect of cam means 51 is substantially directly transmitted to move nozzle 16 toward a vial 18 located in the vial-mounting zone. On the other hand, in the event that a vial should be improperly disposed in the vial-mounting zone, spring 53 serves to permit a limited yielding within the system so as not to cause damage.

As cam means 51 rotates to a position permitting retraction of nozzle 16 from vial 18, the return spring 56 acts directly against a retaining pin 57 disposed through a slot 58 formed diametrically through connecting rod 48 and also extending through slots 59, 61 formed respectively in housing 52 and mounting block 46. A retaining ring or keeper 62 is carried on the near end of pin 57 (see FIG. 1).

Accordingly, during leftward or return movement of connecting rod 48, the return spring 56 acts against pin 57. While spring 56 cannot overcome the force of spring 53, it will be readily evident that spring 56 can urge the entire assembly comprised of housing 52, retaining disc 60, force transfer spring 53 and connecting rod 48, all leftwardly when permitted to do so by the position of cam means 51.

Tubing section 11 is sufficiently flexible to move to the right and left with movement of nozzle 16 between retracted and advanced positions.

After nozzle 16 has forcibly urged vial 18 into a mounted position upon the two nozzles 16, 17, enclosure 19 forms an effective continuation of the feed line so as to interconnect tubing sections 11, 12. As vial 18 is urged to the right (as shown in FIG. 2), the yieldable, stainless steel spring plate 44 moves rightwardly with the end of vial 18 whereby when cam 51 later rotates to a position permitting return spring 56 to urge nozzle 16 to the left (for withdrawing nozzle 16 from the left end of vial 18) spring plate 44 will serve to positively dislodge vial assembly 18 from nozzle 17.

Means have been provided for discharging successive vials 18 from the mounting zone defined between nozzles 16, 17 so as to permit each subsequent vial to enter the mounting zone. As noted above, stop member 45 located across the path of movement of vials entering the mounting zone, and at one side thereof, serves to arrest each vial entering the mounting zone whereby nozzles 16, 17 are substantially aligned in position to be able to pick up each successive vial.

Means have also been provided for discharging each vial as soon as it is released from nozzles 16, 17 as now to be described.

A double-acting ram element such as the end of an air actuated piston rod or electrically operated solenoid armature is disposed to move between raised and lowered positions to move upwardly through an access opening 64 formed through the surface 41 of ramp 42. Actuator 66 such as the air operated piston or solenoid noted above is arranged to drive element 63 between lowered and raised positions in response to suitable controls (not shown).

Having the foregoing general arrangement in mind, the following description of specific details can be more readily understood.

Means for driving nozzle 16 between advanced and retracted positions comprises the motor 67 having an output drive take-off shaft 68 arranged to provide a relatively slow rotational output speed on the order, for example, of 1 rpm. An eccentric assembly comprising a circular bearing shaft 69 attached to the upper end of motor shaft 68 is disposed in an eccentric manner whereby the shaft axis of rotation 72 is disposed off-center of shaft 69. An annular bearing 73 is disposed in driven relation upon shaft 69 in a manner whereby to contact the cam follower surface 55 of housing 52. In this manner as shaft 69 is rotated, housing 52 will be driven cyclically between advanced and retracted positions thereby carrying nozzle 16 between advanced and retracted positions.

Means for providing appropriate electrical indication of the condition of the cycle of operation includes a generally circular cam plate 74 supported for rotation by shaft 69 attached by screws 71 and is cut with an appropriate cam portion, such as shown at 76, to cooperate with switch-actuating armatures 77 arranged in the form of rollers 78 carried on the end of movable support arms 79 whereby microswitches or other types of switches 81 can be operated by depressing or releasing control buttons 82 thereby indicating various conditions of rotation of plate 74 (and hence nozzle 16).

In addition, forward movement of nozzle 16 beyond a predetermined point can be suitably detected by utilizing a microswitch 83 for engaging a portion of the retaining pin 57 so as to determine whether or not a vial 18 is, in fact, located between the two nozzles. Thus, in the event that, for one reason or another, a vial should not be delivered to the vial-mounting zone defined between the two nozzles, activation of switch 83 would readily indicate the absence of such vial and may be appropriately connected to suitable warning or control means.

Similarly, microswitches 81 are employed in a condition-directing manner whereby various stages of operation of the driving movement of nozzle 16 can be determined electrically by interrogating the condition of the various microswitches 81.

After the liquid sample contents of each vial have been discharged by introducing a buffer or other sample carrier liquid via tubing 11 so as to force the liquid sample out of vial 18 to be discharged via tubing 12 and back to the system represented generally by the reference number 15 (FIG. 7), relief movement of cam 51 serves to permit return spring 56 to withdraw nozzle 16 and, at the same time, spring plate 44, carried by the lower end of magazine 39, moves the right hand end of vial 18 from nozzle 17 (FIG. 2) whereupon ejecter element 63 can be actuated to boost vial 18 substantially directly upwardly toward the overhanging lower portion of magazine 39.

Deflector means have been provided on the underside of magazine 39, however, whereby curved surfaces 65 are formed on the confronting inner faces of the side walls of magazine 39. Curved surfaces 65 engage the ends of each upwardly moving vial 18 during its discharge ejection and serve to deflect the vial to move outwardly over the top of stop member 45.

In a high pressure liquid sample analyzing system of a type utilizing individual sample holder units formed with flow passages at their opposite ends, it has been observed that the provision of inert beads within each vial 18 serves to minimize the volume of sample required for each analysis and also serves to enhance block flow of the liquids wherein the end portions of each sample do not become particularly elongated longitudinally through the system and thus the individual samples each advance through the system as s substantial block or mixed material.

Further, it is readily evident from the foregoing that a high pressure seal can be made in the manner described even though each sealing engagement of the flow passages of each vial is relatively transitory.

FIGS. 8 and 9 show additional embodiments of the sample holding unit shown in FIG. 3. A number of the components of these two embodiments are similarly constructed to that shown in the embodiment shown in FIG. 3 and, accordingly, need not be further described, other than to be marked with the same reference numeral and a single or double prime mark ('), ("), respectively associated with FIGS. 8 and 9.

In FIGS. 8 and 9, the sample holding units 88, 98, respectively, are characterized by a porous unitized core 89, 99, respectively, of inert bead-like material disposed within the units 88, 98 whereby the beads are not loosely packed within the unit 88, 98.

Accordingly, the sample holding units 88, 98 do not require the use of sealing plugs 34, 37 as shown in FIG. 3 in view of the fact that the inert granular beads of inert material comprising the core elements 89, 99 are secured to themselves. Thus, the chances of beads being free to circulate within the system and cause damage will be minimized.

In general, the granules of bead-like material are bonded together in adhering relation each to the other, while leaving sufficient spacing or pores between them to permit fluid flow therethrough. In the sample holding unit 88, core 89 consists of a number of sections of such core material placed one after another into the cylindrical opening 91 of unit 88.

The region between the embodiment sections 89a and 89b can be filled with similar sections or filled with a deposit of loosely contained (unadhered) beads 36

(as was shown in FIG. 3) and, in this way, accomplish substantially the same results as described above.

The porous material forming cores 89, 99 should be a permeable structure having omnidirectional interconnecting pores so as to constitute a porous unitary body. One particularly suitable material is ultra-high molecular weight polyethylene compacted together in the manner as sold presently by the Porex Materials Corporation of Fairburn, Georgia.

Accordingly, as noted above, a core such as the cores 89, 99 have the singular advantage of precluding any possible introduction of the fine beads of material into the system which they might conceivably cause damage.

Also, by use of the present arrangement, the plugs 34, 37 may be eliminated.

Accordingly, it should be readily evident that there has been provided an improved sample carrying vial and means for introducing a succession of such vials and their liquid sample into a liquid analyzing system under substantial pressure.

I claim:

1. In a system for analyzing the constituents of a liquid sample of a type wherein buffers or other sample carrier liquids are applied to liquid sample disposed in individual vials of a type having flow passages at each end thereof, means forming a liquid feed line including an open section thereof defined between axially aligned open end portions of the line, a tapered protruding nozzle carried on each said portion, said nozzles being spaced sufficiently to receive one of said vials therebetween for interposing said one vial in fluid communication with said feed line via said flow passages, means for positioning one of said vials into said open section of feed line, said vial flow passages terminating at their axially outer ends in an axially inwardly tapered conical surface for engaging said nozzles, the angle of taper of said nozzles being slightly greater than the angle of taper of said control surfaces to cause said nozzles to initially engage and be guided by its associated one of said conical surfaces at the outer edge margin thereof to seal therewith and align said flow passages of said vial with those of said nozzles, and means for relatively moving said nozzles axially together to engage the flow passages of the vial positioned therebetween thereby interconnecting said open end portions of the feed line via said vial.

2. In a system for analyzing the constituents of a liquid sample according to claim 1 further including means for successively supplying each of a series of said vials to said open section, and means movable between advanced and retracted positions for engaging and ejecting each vial from said open section to permit a subsequent vial to enter said open section.

3. In a system for analyzing the constituents of a liquid sample of a type wherein buffers or other sample carrier liquids are applied to liquid sample disposed in individual vials of a type having flow passages at each end thereof, means forming a liquid feed line including an open section thereof defined between axially aligned open end portions of the line, a tapered protruding nozzle carried on each said portion, said nozzles being spaced sufficiently to receive one of said vials therebetween for interposing said one vial in fluid communication with said feed line via said flow passages, means for positioning one of said vials into said open section of feed line, said vial flow passages terminating at their axially outer ends in an axially inwardly tapered conical surface for engaging said nozzles, and means for relatively moving said nozzles axially together to engage the flow passages of the vial positioned therebetween thereby interconnecting said open end portions of the feed line via said vial, said flow passages being recessed conical surfaces diverging at a predetermined angle and said tapered nozzles being formed to include conical surfaces diverging at an angle greate than said predetermined angle.

4. In a system for analyzing the constituents of a liquid sample of a type wherein buffers or other sample carrier liquids are applied to sample carried in individual elongated vials formed at each end to provide a flow passage therein formed at its axially outer end to terminate with an axially inwardly tapered conical surface, means forming a feed line for carrying buffer or other sample carrier liquid into and out of said vials via said flow passages, said feed line including a discontinuity therein defining a vial receiving zone for disposing one of said vials into said feed line, said discontinuity being characterized by a pair of aligned, confronting, hollow, protruding, tapered nozzles for engaging and interconnecting said vial flow passages therewith for transferring liquid via said vial along the feed line, the angle of taper of said nozzles being slightly greater than the angle of taper of said conical surfaces to cause said nozzles to initially engage and be guided by its associated one of said conical surfaces at the outer edge margin thereof to seal therewith and align said flow passages of said vial with those of said nozzles, means for relatively moving said nozzles between retracted and advanced positions to engage said inwardly conical surfaces to couple and decouple said nozzles with said vial flow passages, and means for successively interposing each of a series of vials of sample into said zone in the feed line.

5. In a system for analyzing the constituents of a liquid sample of a type wherein buffers or other sample carrier liquids are applied to sample carried in individual elongated vials formed at each end to provide a flow passage therein formed at its axially outer end to terminate with an axially inwardly tapered conical surface, means forming a feed line for carrying buffer or other sample carrier liquid into and out of said vials via said flow passages, said feed line including a discontinuity therein defining a vial receiving zone for disposing one of said vials to said feed line, said discontinuity being characterized by a pair of aligned, confronting, hollow, protruding, tapered nozzles for engaging and interconnecting said vial flow passages therewith for transferring liquid via said vial along the feed line, means for relatively moving said nozzles between retracted and advanced positions to engage said inwardly conical surfaces to couple and decouple said nozzles with said vial flow passages, and means for successively interposing each of a series of vials of sample into said zone in the feed line, said means for relatively moving said nozzles including a resilient drive connection for transmitting forces therethrough and coupled to move one of said nozzles relatively axially toward the other.

6. In a system for analyzing the constituents of a liquid sample of a type wherein buffers or other sample carrier liquids are applied to sample carried in individual elongated vials formed at each end to provide a flow passage therein, means forming a feed line for carrying buffer or other sample carrier liquid into and out of said vials via said flow passages, said feed line including a discontinuity therein defining a vial receiving zone for disposing one of said vials into said feed line, said discontinuity being characterized by a pair of aligned, confronting, hollow nozzles for engaging and interconnecting said vial flow passages therewith for transferring liquid via said vial along the feed line, means for relatively moving said nozzles between retracted and advanced positions to couple and decouple said nozzles with said vial flow passages, and means for successively interposing each of a series of vials of sample into said zone in the feed line, the last named means comprises a magazine for containing a plurality of vials, a guideway formed in said magazine, said vials being supported in said guideway for movement into said vial receiving zone, a stop member in the path of vials entering said zone at one side thereof serving to arrest each vial entering said zone, and means for discharging each vial from said zone to permit a subsequent vial to enter same.

7. In a system for analyzing the constituents of a liquid sample according to claim 6 wherein the last named means comprises means for upwardly boosting a vial from said zone, deflector means disposed at a level above said stop member and serving to deflect the upwardly moving vial clear of said zone.

8. In a system for analyzing the constituents of a liquid sample of a type wherein buffers or other sample carrier liquids are applied to liquid sample carried in individual elongated vials to be disposed into a liquid feed line formed to include confronting nozzles aligned to enter flow passages at each end of a vial disposed in a vial-mounting zone defined therebetween, and further having means for boosting a vial from said zone to discharge the vial therefrom, a magazine to be charged with vials to be supplied successively to said zone, an inclined ramp within said magazine for rollingly carrying a plurality of vials therealong, an opening in said magazine for discharging the vials into said zone to receive said nozzles, deflector means carried by said magazine and forming a path for deflecting each vial clear of said zone when boosted from said zone by the first named said means.

9. In a system for analyzing the constituents of a liquid sample according to claim 8 wherein said inclined ramp includes interconnected portions sloping downwardly in opposite directions.

10. For use in a system for analyzing the constituents of liquid sample of a type wherein buffers or other sample carrier liquids are applied to sample carried in individual elongated vials of a type to be loosely disposed into a liquid feed line formed to include confronting tapered protruding nozzles aligned on a common axis and movable between advanced and retracted positions on said axis, the nozzles being tapered at a predetermined angle, a sample holding unit comprising body means forming a cylindrical, hollow elongated enclosure formed of inert material for holding liquid sample, inert beads packed within said enclosure for minimizing sample-occupied space therein, porous plugs at each end of said enclosure for passing liquid therethrough while retaining said beads, flow passages at each end of said enclosure, each said flow passage being formed with conically shaped recessed side wall surfaces diverging radially and axially outwardly of said enclosure for receiving the tapered nozzles seated therein, the side wall surfaces diverging at an angle less than the predetermined angle and adapted to cause the nozzles to initially engage an associated one of said conical side wall surfaces at the outer edge margin thereof and be guided by same to seal therewith while aligning the nozzles with the flow passages of the sample holding unit.

11. For use in a system for analyzing the constituents of liquid sample of a type wherein buffers or other sample carrier liquids are applied to sample carried in individual elongated vials of a type to be disposed into a liquid feed line formed to include confronting tapered nozzles aligned on a common axis, a sample holding unit comprising body means forming a cylindrical, hollow elongated enclosure formed of inert material for holding liquid sample, inert beads packed within said enclosure for minimizing sample-occupied space therein, porous plugs at each end of said enclosure for passing liquid therethrough while retaining said beads, flow passages at each end of said enclosure, each said flow passage being formed with conically shaped recessed side wall surfaces diverging radially and axially outwardly of said enclosure for receiving the tapered nozzles seated therein, said sample holding unit further including an insert element disposed in one end of said enclosure to form a portion of one of said conically shaped side wall surfaces, the other of said side wall surfaces being formed solely from said body means.

12. A sample holding unit according to claim 11 further including a rigid cylindrical jacket tightly encircling said body means.

13. For use in a system for analyzing the constituents of liquid sample of a type wherein buffers or other sample carrier liquids are applied to sample carried in individual elongate vials to be disposed into a liquid feed line formed to include confronting nozzles aligned on a common axis, a sample holding unit comprising body means forming a cylindrical, hollow elongate enclosure formed of inert material for holding liquid sample, a porous unitized core body of inert bead-like material disposed within said enclosure for minimizing sample-occupied space therein but leaving sufficient spacing between adhered beads to permit fluid flow therethrough, flow passages at each end of said enclosure, each said flow passage being formed and adapted to couple to one of said nozzles thereat.

14. For use in a system of the kind described, a sample holding unit comprising body means of inert material forming a cylindrical, hollow elongate enclosure for holding liquid sample, a porous unitized core of inert bead-like material disposed within said enclosure for minimizing sample-occupied space therein, flow passages at each end of said enclosure, each said flow passage being formed and adapted to provide a sealed connection with a nozzle thereat free of sealing elements interposed between said nozzle and its associated flow passage for feeding fluid through said unit via said core.

15. For use in a system of the kind described a sample holding unit comprising body means of inert material forming a cylindrical, hollow elongate enclosure for holding liquid sample, a porous core of inert material disposed within said enclosure for minimizing sample-occupied space therein, flow passages at each end of said enclosure, each said flow passage being formed and adapted to couple to a nozzle thereat for feeding fluid through said unit via said core, said core comprising a unitary compaction of inert beads bonded together in adhering relation each to the other but leaving sufficient spacing between adhered beads to permit fluid flow therethrough.

16. For use in a system of the kind described a sample holding unit comprising body means of inert material forming a cylindrical, hollow elongate enclosure for holding liquid sample, a porous core of inert material disposed within said enclosure for minimizing sample-occupied space therein, flow passages at each end of said enclosure, each said flow passage being formed and adapted to couple to a nozzle thereat for feeding fluid through said unit via said core, said core comprising a plurality of core sections, at least the endmost core sections adjacent the flow passages comprising a unitary compaction of inert beads bonded together in adhering relation each to the other but leaving sufficient spacing between adhered beads to permit fluid flow therethrough.

17. For use in a sample holding unit of the kind described a core portion including a porous unitary body of permeable plastic bead-like material having omnidirectional interconnecting pores, said body being formed and adapted to be insertable as a unit into a sample holding unit.

* * * * *